(12) United States Patent
Moore et al.

(10) Patent No.: US 9,205,838 B2
(45) Date of Patent: Dec. 8, 2015

(54) CONTROLLING THE SPEED OF A VEHICLE DURING PARKING

(71) Applicant: Ford Global Technologies, LLC, Dearborn, MI (US)

(72) Inventors: Ian Moore, Pulheim (DE); Nadja Wysietzki, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/311,421

(22) Filed: Jun. 23, 2014

(65) Prior Publication Data

US 2015/0012202 A1 Jan. 8, 2015

(30) Foreign Application Priority Data

Jul. 2, 2013 (DE) .......................... 10 2013 212 911

(51) Int. Cl.
| | | |
|---|---|---|
| G05D 1/00 | (2006.01) | |
| B60W 30/18 | (2012.01) | |
| B60W 10/06 | (2006.01) | |
| B60W 10/188 | (2012.01) | |
| B60W 30/06 | (2006.01) | |
| B60W 50/14 | (2012.01) | |
| B60W 10/00 | (2006.01) | |
| B60W 10/18 | (2012.01) | |

(52) U.S. Cl.
CPC .............. *B60W 30/181* (2013.01); *B60W 10/00* (2013.01); *B60W 10/06* (2013.01); *B60W 10/18* (2013.01); *B60W 10/188* (2013.01); *B60W 30/06* (2013.01); *B60W 50/14* (2013.01); *B60W 2520/10* (2013.01); *B60W 2540/04* (2013.01); *B60W 2550/10* (2013.01); *B60W 2710/0677* (2013.01); *B60W 2710/182* (2013.01); *B60W 2720/10* (2013.01)

(58) Field of Classification Search
CPC ... B60W 10/06; B60W 10/188; B60W 50/14; B60W 30/181; B60W 30/06
USPC .............. 701/22, 67, 93; 340/903, 901, 932.2
See application file for complete search history.

(56) References Cited

U.S. PATENT DOCUMENTS

2004/0226768 A1* 11/2004 DeLuca et al. ................. 180/275
2012/0310459 A1* 12/2012 Schwitters et al. ............. 701/22

FOREIGN PATENT DOCUMENTS

| DE | 19607788 | 9/1997 |
| DE | 102007027357 | 12/2007 |
| DE | 10201102535 | 2/2012 |

OTHER PUBLICATIONS

Examination Report, DE 102013212911.4, Feb. 27, 2014, 7 pages.

* cited by examiner

*Primary Examiner* — Gertrude Arthur Jeanglaude
(74) *Attorney, Agent, or Firm* — Raymond L. Coppiellie; Bejin Bieneman PLC

(57) ABSTRACT

Regulating a speed of a motor vehicle during an automated parking operation comprises measuring a speed of the motor vehicle during the automated parking operation, comparing the measured speed with a predefined speed value, reducing an engine power of an internal combustion engine of the motor vehicle and increasing a brake pressure of a brake of the motor vehicle if the measured speed is higher than predefined by the predefined speed value, and increasing the engine power and reducing the brake pressure if the measured speed is lower than predefined by the predefined speed value.

18 Claims, 4 Drawing Sheets

CONTROLLING THE SPEED OF A VEHICLE DURING PARKING

CROSS-REFERENCE TO RELATED APPLICATION

This application claims priority to and all the benefits of German Patent Application No. 102013212911.4, filed on Jul. 2, 2013, which is hereby incorporated by reference in its entirety.

The present disclosure relates to the automated parking of a motor vehicle, wherein a speed of the motor vehicle is regulated during the automated parking. Further disclosed herein is a motor vehicle designed to carry out such automated parking.

BACKGROUND

In motor vehicles, assistance systems that perform certain tasks for controlling the vehicle for the driver are becoming increasingly widespread. Examples of such systems are lane change assistants or parking assistants. In such systems, the driver can override interventions by the assistance system at any time, such interventions being according to predefined steering values provided by the assistance system, for example, if a malfunction of the assistance system occurs or an unexpected situation, and/or a situation that cannot be handled by the assistance system, occurs. In order to increase driver comfort, fully automatic parking assistance systems have been developed which, after activation by the driver, can help to detect a suitable parking space of sufficient length and maneuver the motor vehicle into the parking space. In this context, an increase in the accuracy of the parking is desirable so that the motor vehicle can be maneuvered in an automated fashion into ever-smaller parking spaces, without the risk of collision with a vehicle which is parked in front of or behind the parking space.

SUMMARY AND DETAILED DESCRIPTION

Automated parking of a motor vehicle is disclosed herein. A speed of the motor vehicle is regulated during the automated parking, wherein the speed of the motor vehicle is measured and the measured speed is compared with a predefined speed value. An engine power of an internal combustion engine of the motor vehicle is reduced, and also a brake pressure of a brake of the motor vehicle is increased, if the measured speed is higher than the predefined speed value. Furthermore, the engine power is increased, and also the brake pressure is reduced, if the measured speed is lower than the predefined speed value.

Advantageously, the speed of the motor vehicle can be set very precisely, and, in particular, to very low speeds during the automated parking. Typical speeds during the automated parking are 3 km/h and below. The speed may be advantageously regulated through the use of the brake, with the result that the internal combustion engine operates against the braking effect of the brake. As a result, the automatic parking maneuver can be carried out very precisely and without impediment by unexpected changes in a rolling resistance. Further, automatic parking on a slope may be carried out without difficulty.

In particular, during the automated parking, the brake pressure can be set to a brake admission pressure before the regulation of the speed of the motor vehicle is commenced. The brake admission pressure may be selected in such a way that the brake slips, that is to say applies a certain braking effect but does not block the internal combustion engine. As a result, the starting speed of the motor vehicle can be controlled well.

The brake admission pressure may be selected as a function of the predefined speed value. It can be provided, for example, for different predefined speed values to be set for different phases of the automated parking. For example, a higher speed can be predefined for a first resetting of the motor vehicle in a lane than during swinging into the parking space or approaching an obstacle which bounds the parking space at the front or the rear.

In particular, a first brake admission pressure can be selected for a first predefined speed value, and a second brake admission pressure can be selected for a second predefined speed value, wherein the first predefined speed value is lower than the second predefined speed value, and the first brake admission pressure is higher than the second brake admission pressure.

The predefined speed value preferably comprises a lower limiting speed and an upper limiting speed. The upper limiting speed is higher than the lower limiting speed. In this context, the brake pressure and the engine power are changed only if the measured speed of the motor vehicle exceeds the upper limiting speed or undershoots the lower limiting speed. As a result, a tolerance range is produced in which the speed of the motor vehicle is not actively changed despite a predefined deviation by the limiting speeds from the desired speed. This stabilizes the regulating algorithm.

Advantageously, the presently disclosed subject matter is useful in particular for low speeds. In particular, an idling speed of the motor vehicle in a gear speed of the motor vehicle with a maximum transmission ratio can exceed the upper limiting speed, and the upper limiting speed can therefore be selected to be so low that the speed of the motor vehicle is below the idling speed. A large transmission ratio is usually provided for the first gear speed and the reverse gear speed of the motor vehicle, wherein the disclosed subject matter is not limited to the use in motor vehicles having manual gearboxes, but can be used particularly advantageously in motor vehicles with automatic transmissions such as, for example, automated manual transmissions (ASG), direct shift transmissions (DSG) or torque converters. Depending on a direction of travel desired at any time during automated parking, the gear speed with the largest transmission ratio can therefore be the first gear speed or the reverse gear speed.

A distance between the motor vehicle and an obstacle in a direction of travel may be sensed and the predefined speed value may be determined as a function of the sensed distance. For example, the predefined speed value can be selected such that the motor vehicle drives into the parking space at 3 km/h, and the speed is reduced to 2 km/h if the distance from a closest obstacle in the respective direction of travel drops below a specific threshold, and the speed is finally reduced further to 1 km/h if the distance undershoots a further, lower threshold until the motor vehicle is finally braked.

Given a sudden occurrence of an obstacle, intervention by the driver may be required. The automated parking process is then interrupted, i.e. set to a "pause" mode. By active action by the driver, for example by a pushbutton key provided for this purpose being pressed, the process, i.e. the parking process, can be continued.

A second aspect of this disclosure relates to a motor vehicle having an internal combustion engine for driving the motor vehicle, and a brake for braking the motor vehicle. The brake comprises here a brake controller which is designed to carry out the method according to the invention. The work of the brake controller can, however, be additionally assisted or replaced by other controllers located in the vehicle if these controllers can regulate the vehicle speed.

BRIEF DESCRIPTION OF THE DRAWINGS

The invention is described in more detail below with reference to illustrations of exemplary embodiments, in which.

DETAILED DESCRIPTION OF EXEMPLARY EMBODIMENTS

Figure 1:
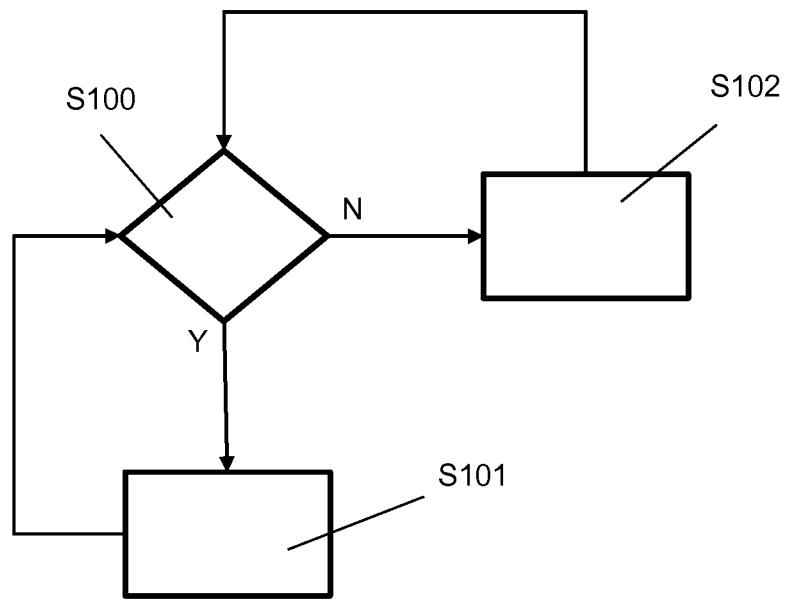
FIG. 1 shows an exemplary embodiment of a method for regulating a speed of a motor vehicle.

FIG. 1 shows an exemplary embodiment of a method for regulating a speed of a motor vehicle. In a step S100, it is checked whether the speed of the motor vehicle is higher than the speed which is predefined by the predefined speed value. If this is the case, the system continues with a step S101, in which a brake pressure of a brake of the motor vehicle is increased and an engine power of an internal combustion engine of the motor vehicle is reduced. After the step S101, the system branches back again to the step S100. If, on the other hand, it is detected in step S100 that the speed of the motor vehicle is not higher than predefined by the predefined speed value, the system continues with step S102, in which the brake pressure of the brake is reduced, and the engine power of the internal combustion engine of the motor vehicle is increased. This exemplary embodiment constitutes the simplest implementation of the presently disclosed method for regulating the speed of the motor vehicle during the automated parking of the motor vehicle. The method is particularly suitable for reliably setting the low speeds of, for example, 3 km/h or less which are desired during the automated parking with a high degree of accuracy.

In one advantageous refinement of the method illustrated in FIG. 1, it is possible to provide for, in step S100, the speed of the motor vehicle to be compared with an upper and a lower limiting speed. If the upper limiting speed is exceeded, then step S101 is carried out, and if the lower limiting speed is undershot, however, then step S102 is carried out. If the speed of the motor vehicle is, in contrast, between the upper and the lower limiting speed, the brake pressure and the engine power are kept unchanged.

Figure 2:
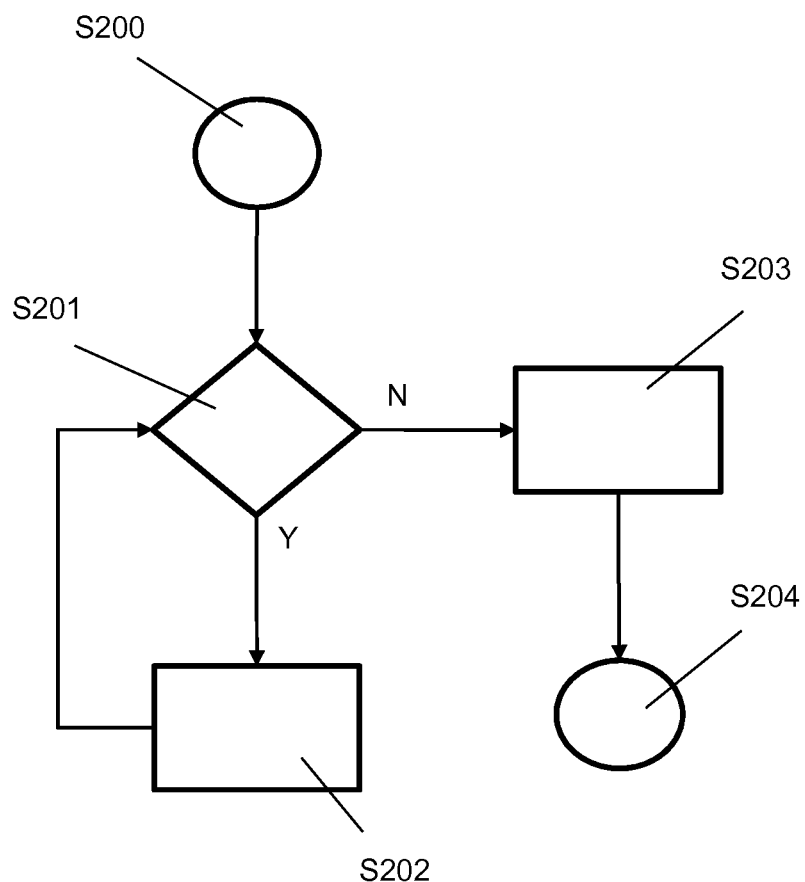
FIG. 2 shows a first exemplary embodiment of a method for the automated parking of a motor vehicle.

FIG. 2 shows a first exemplary embodiment of a method for the automated parking of a motor vehicle. The method starts in an initial step S200, for example, when a triggering signal is received, which requires automated parking of the motor vehicle into a suitable parking space. In step S201, it is checked whether the distance from an obstacle in the direction of travel is larger than a safety distance, for example, larger than 30 cm. The obstacle is usually another vehicle or another object which bounds the parking space in the current direction of travel of the motor vehicle. If the test in step S201 leads to a positive result, in step S202 a method for regulating the speed of the motor vehicle is started with a suitable predefined speed value. The method can be one of the methods described with respect to FIG. 1.

After starting the method for regulating the speed of the motor vehicle, the system branches back to step S201. In this context, the method for regulating the speed usually continues in parallel or in quasi-parallel with respect to the method in FIG. 2. If it is detected in step S201 that the distance to the closest obstacle is smaller than the safety distance, in step S203 braking of the motor vehicle as far as the stationary state thereof is carried out and the method finishes in step S204. However, the method in FIG. 2 can also be carried out repeatedly for alternating directions of travel (forward/backward) in order to permit parking in a relatively narrow parking space with repeated forward and backward movement of the motor vehicle.

Figure 3:
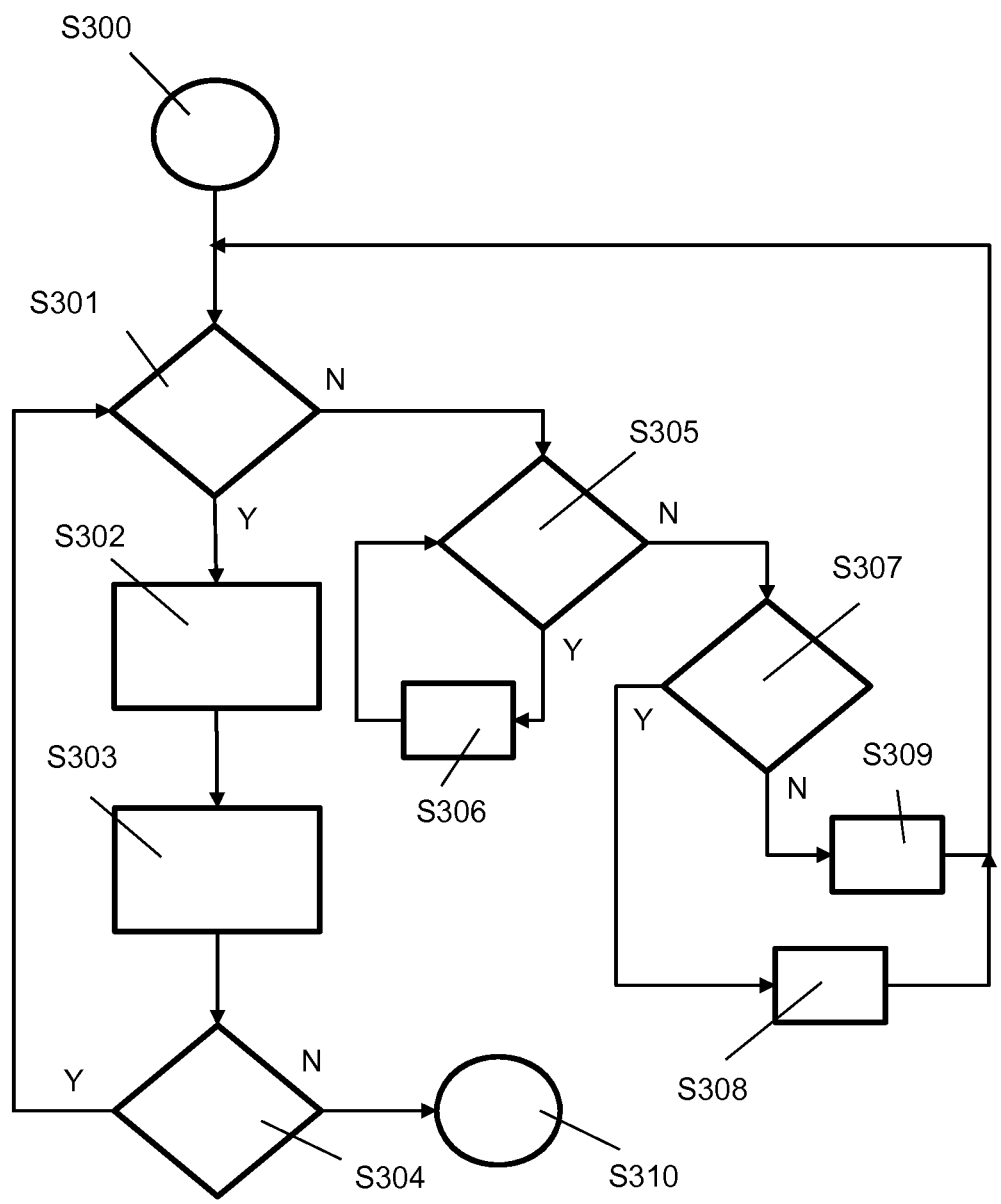
FIG. 3 shows a second exemplary embodiment of a method for the automated parking of a motor vehicle.

FIG. 3 shows a second exemplary embodiment of a method for the automated parking of a motor vehicle which, after an initial step S300 which is started, for example, via a triggering signal, checks in step 301 whether an unexpected obstacle has been detected in the direction of travel of the motor vehicle. Such an unexpected obstacle can be identified, for example, through a distance of the obstacle from the vehicle, which distance changes independently of the movement of the motor vehicle itself, that is to say through a changing absolute position of the obstacle. Furthermore, in addition or alternatively, other methods of detecting unexpected obstacles can be used, for example ones which detect a low obstacle such as curbstones or the like, which should not impact the motor vehicle in the course of the automated parking but which possibly cannot be detected reliably by conventional distance sensors. If such an unexpected obstacle is detected, in a subsequent step S302, the brake pressure of the brake of the motor vehicle is quickly increased in order to place the motor vehicle in the stationary state in as short a time as possible. Subsequently, in step S303 the brake pressure can be reduced to a predefined value which, however, still keeps the motor vehicle in a stationary state, i.e. in what is referred to as a "pause" mode. The step S303 can be carried out, for example, for a predetermined time period which is sufficient to give the driver of the motor vehicle opportunity to assume full control of the motor vehicle again. If, for example at S304, the driver then presses a pushbutton key, the method is continued as long as this pushbutton key is pressed. When the pushbutton key is released, the method is then continued at step S301.

If no unexpected obstacle has been detected in step S301, the system continues with step S305, in which it is checked whether the speed of the motor vehicle is higher than an upper limiting speed. The upper limiting speed can be, for example, a predefined speed plus a tolerance range. If the speed is actually higher than the upper limiting speed, in step S306 the brake pressure is increased and the engine power is reduced, after which the method branches back again to step S305. If, on the other hand, it has been detected that the upper limiting speed has not been exceeded, in step S307 it is checked whether the speed of the motor vehicle undershoots a lower limiting speed. This lower limiting speed can be the predefined speed minus the tolerance range. If the speed of the motor vehicle undershoots the lower limiting speed, in step S308 the brake pressure is reduced and the engine power is increased. Otherwise, in step S309 the brake pressure and the engine power are maintained at their current levels. The method subsequently branches back to step S301. The method can be carried out until it is interrupted by an external signal and ended. For this reason, for example an additional step of checking the reception of the external signal can be added, which additional step branches, in the case of the reception, to the step S304 where the method is ended.

Figure 4:
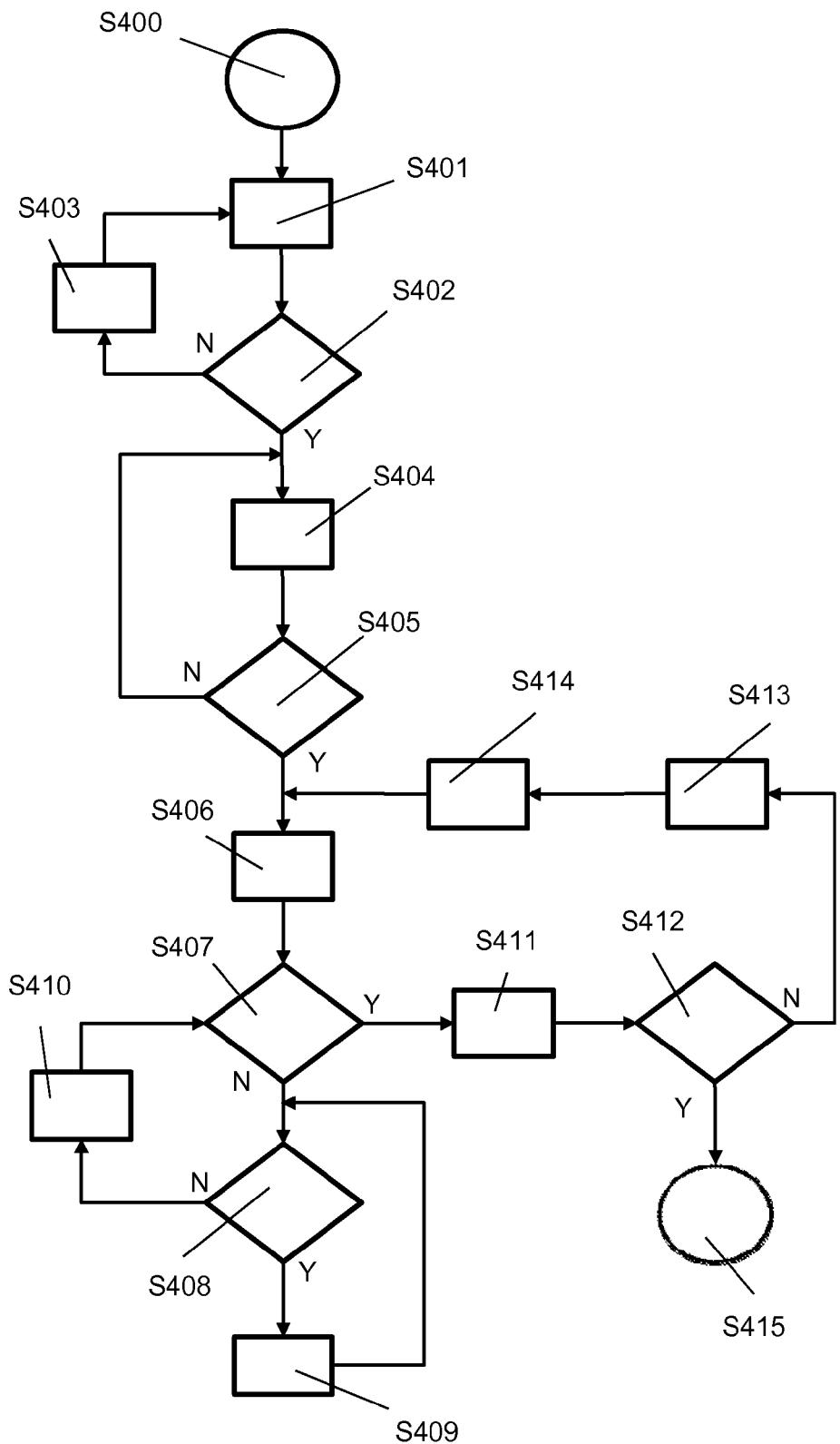
FIG. 4 shows a third exemplary embodiment of a method for the automated parking of a motor vehicle.

FIG. 4 shows a third exemplary embodiment of a method for the automated parking of a motor vehicle. The method starts in a step S400 if a triggering signal is received, which indicates the desire of the driver for automated parking of the motor vehicle. The triggering signal can be triggered by the driver during the travel of the motor vehicle, with the result that the motor vehicle can assist in searching for a suitable parking space. In the example of FIG. 4, in a step S401 a suitable parking space is searched for, for which, for example, radar-assisted or optical methods can be used to detect the parking spaces are presented and to measure them as the vehicle travels past them, in order to be able to detect whether the parking space provides sufficient space for the motor vehicle. These methods can be assisted by consulting map material such as the map material of a satellite-assisted navigation system.

If a suitable parking space is detected in step S401, this can be indicated to the driver so that the driver places the motor vehicle in a stationary state. If appropriate, this can also be done automatically. If the motor vehicle has entered a stationary state, it is checked in step S402 whether the reverse gear speed has been engaged. The engagement of the reverse gear speed can take place automatically in a motor vehicle with an automatic transmission, but it is also possible to dispense with automatic engagement of reverse, so that it remains up to the driver to actively bring about the start of the actual parking maneuver, e.g., by engaging a reverse gear. If the reverse gear speed is not engaged, after a waiting step S403 the system branches back to step S402, where it is checked again whether the reverse gear speed is engaged. If this is the case, the method continues in step S404, in which a method for regulating the speed of the motor vehicle with a suitable predefined speed value is started, which method can be, for example, one of the methods described with respect to FIG. 1. The predefined speed value can be, for example, 3 km/h. The method for regulating the speed of the motor vehicle is carried out until it is detected in step S405 that a steering angle of the motor vehicle has reached a predefined value. In this case, in step S406 a new predefined speed value is set and the method for regulating the speed of the motor vehicle is started with the new predefined speed value. This predefined speed value is usually lower than the preceding one, for example 2 km/h. In step S407 it is then checked whether a distance from an obstacle which bounds the parking space is larger than a safety distance. If this is not the case, in step S411 a braking maneuver is carried out in order to place the motor vehicle in a stationary state.

In step S412 it is then checked whether the motor vehicle has reached the target position. If this is the case, the method is ended in step S415. Otherwise, the system continues with step S413, in which a change of direction from a reverse gear speed into a forward gear speed, or vice versa, is brought about. This can take place either fully automatically or can be requested by an indication to the driver, wherein in step S413 the system then waits until the required gear speed is actually engaged. Subsequently, in a step S414 the system waits for a new steering angle to be set or sets the new steering angle. Then, the method returns to step S406, in which the method for regulating the speed of the motor vehicle is started again. If, in contrast, in step S407 it is detected that the distance from the obstacle which bounds the parking space is larger than the safety distance, in step S408 it is checked whether the distance is furthermore also larger than an extended safety distance which is larger than the safety distance. As long as this is the case, in steps S408 and S409 the predefined speed value of step S406 is retained. However, if the extended safety distance is undershot, in step S410 a third predefined speed value is set which is below that in steps S406 and S409 and can be, for example, 1 km/h. Alternatively, the method in FIG. 3 can also be used to regulate the speed. The system returns from step S410 to step S407 in which, as described, it is checked whether the safety distance is complied with.

Although the invention has been illustrated and described in detail by means of exemplary embodiments, the invention is not limited by the disclosed examples. Variations of the invention can be derived by a person skilled in the art from the exemplary embodiments shown without departing from the scope of protection of the invention, as defined in the claims.

The invention claimed is:

1. A method for regulating a speed of a motor vehicle during an automated parking operation, the method comprising:
   measuring a speed of the motor vehicle during the automated parking operation;
   comparing the measured speed with a predefined speed value;
   reducing an engine power of an internal combustion engine of the motor vehicle and increasing a brake pressure of a brake of the motor vehicle if the measured speed is higher than predefined by the predefined speed value; and
   increasing the engine power and reducing the brake pressure if the measured speed is lower than predefined by the predefined speed value.

2. The method of claim 1, further comprising setting the brake pressure to a brake admission pressure before increasing or reducing the brake pressure.

3. The method of claim 2, further comprising selecting the brake admission pressure as a function of the predefined speed value.

4. The method of claim 3, further comprising selecting a first brake admission pressure for a first predefined speed value, and selecting a second brake admission pressure for a second predefined speed value, wherein the first predefined speed value is lower than the second predefined speed value, and the first brake admission pressure is higher than the second brake admission pressure.

5. The method of claim 1, wherein the predefined speed value comprises a lower limiting speed and an upper limiting speed.

6. The method of claim 5, wherein an idling speed of the motor vehicle in a gear speed of the motor vehicle with a maximum transmission ratio exceeds the upper limiting speed.

7. The method of claim 1, further comprising:
   detecting a distance between the motor vehicle and an obstacle in a direction of travel that is sensed; and
   determining the predefined speed value as a function of the sensed distance.

8. The method of claim 7, further comprising, upon detection of an obstacle, activating a mechanism requiring driver intervention.

9. The method of claim 8, wherein the mechanism requiring driver intervention includes a pushbutton key that has to be pressed by the driver in order for the automated parking operation to be continued.

10. A brake controller in a motor vehicle having an internal combustion engine for driving the motor vehicle and a brake for braking the motor vehicle, wherein the brake controller is configured to:
    measure a speed of the motor vehicle during an automated parking operation;
    compare the measured speed with a predefined speed value;
    reduce an engine power of an internal combustion engine of the motor vehicle and increase a brake pressure of a brake of the motor vehicle if the measured speed is higher than predefined by the predefined speed value; and increase the engine power and reduce the brake pressure if the measured speed is lower than predefined by the predefined speed value.

11. The controller of claim 10, further configured to set the brake pressure to a brake admission pressure before increasing or reducing the brake pressure.

12. The controller of claim 11, further configured to select the brake admission pressure as a function of the predefined speed value.

13. The controller of claim 12, further configured to select a first brake admission pressure for a first predefined speed value, and to select a second brake admission pressure for a second predefined speed value, wherein the first predefined speed value is lower than the second predefined speed value, and the first brake admission pressure is higher than the second brake admission pressure.

14. The controller of claim 10, wherein the predefined speed value comprises a lower limiting speed and an upper limiting speed.

15. The controller of claim 14, wherein an idling speed of the motor vehicle in a gear speed of the motor vehicle with a maximum transmission ratio exceeds the upper limiting speed.

16. The controller of claim 10, further configured to:
   detect a distance between the motor vehicle and an obstacle in a direction of travel that is sensed; and
   determine the predefined speed value as a function of the sensed distance.

17. The controller of claim 16, further configured to, upon detection of an obstacle, activate a mechanism requiring driver intervention.

18. The controller of claim 17, wherein the mechanism requiring driver intervention includes a pushbutton key that has to be pressed by the driver in order for the automated parking operation to be continued.

* * * * *